L. T. JOHNSON.
SCALE.
APPLICATION FILED NOV. 24, 1916.
1,309,436.
Patented July 8, 1919.
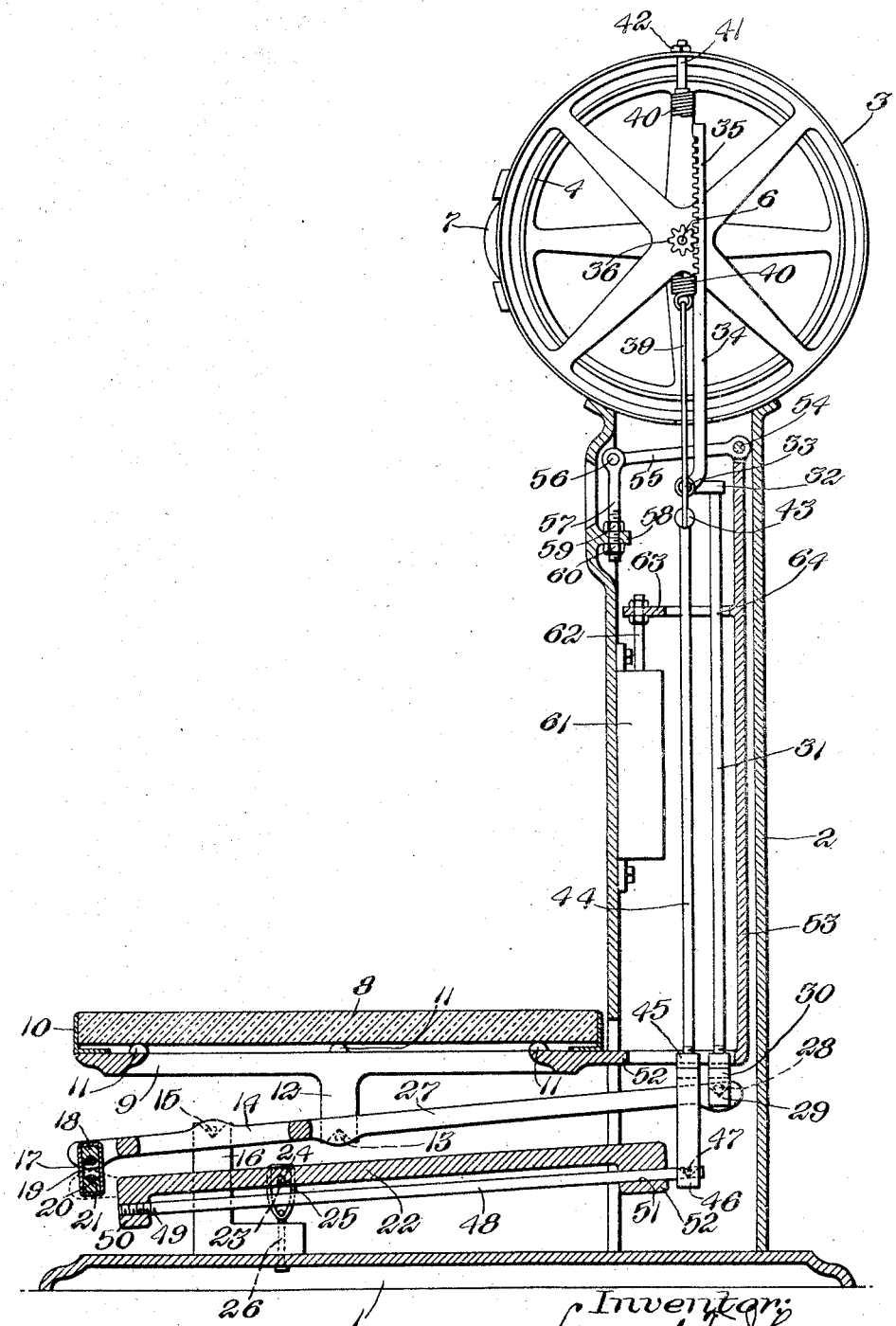

ated July 8, 1919.
UNITED STATES PATENT OFFICE.

LEONARD T. JOHNSON, OF BOSTON, MASSACHUSETTS.

SCALE.

1,309,436.

Specification of Letters Patent.

Patented July 8, 1919.

Application filed November 24, 1916. Serial No. 133,243.

*To all whom it may concern:*

Be it known that I, LEONARD T. JOHNSON, a citizen of the United States, and resident of Boston, in the county of Suffolk and State of Massachusetts, have invented an Improvement in Scales, of which the following description, in connection with the accompanying drawings, is a specification, like letters on the drawings representing like parts.

My present invention is an improved automatic price indicating scale preferably of the type using a plurality of parallel levers, illustrated in my copending application Ser. No. 79,314, filed February 18, 1916. As explained in said copending application I prefer to use a pair of substantially parallel operating levers between the platform or weight-receiving portion of the scale and the weighing mechanism and price indicating portion of the scale, and my present invention relates particularly to the construction and operation of said levers. I prefer to arrange said parallel levers so that one only will be utilized to operate the price-indicating or price-computing mechanism and chart, while the other lever will be connected with the springs or weighing mechanism. This construction is of special advantage in a number of ways. It enables me to use a strong spring or springs on the weighing mechanism and to have the weight-receiving platform move only a short distance; both of which are important advantages, the strong springs and short vertical movement being desirable and enabling the springs to stand up under use with greater accuracy than where a weak long spring is used. Furthermore, an advantage of this construction consists in enabling the separate levers to be so proportioned that while the weighing mechanism is being moved a comparatively short distance, yet the price indicating or computing mechanism will be moved more rapidly and thus quickly showing the price computations. In the scale of the drawings I have illustrated this feature by having the weighing mechanism lever and the price indicating lever actuated in a predetermined ratio, *i. e.*, while the weighing mechanism moves a short vertical distance to balance the weight received on the platform, the price computing mechanism moves nearly twice the distance to rotate the cylinder containing the price computations. This permits quick readings and greater accuracy. I also prefer to utilize a thermostat in connection with one of the levers, it being only necessary to compensate for varying degrees of temperature in either the weighing mechanism or the indicating devices, and as herein shown I prefer to employ the thermostat in connection with the weighing lever.

Referring to the drawings illustrating a preferred embodiment of the invention, an automatic platform price-computing scale of the type shown in my said prior application embodies the present invention.

A suitable standard or base 1 carries a vertical support 2 at the rear of said base, which support is hollow to receive the connections between the platform and weighing springs and price-indicating chart. At the upper part of the standard 2 is secured a cylinder 3 containing the price chart or drum 4 mounted upon a pair of side frames or arbors 5 supported by an axle 6 extending lengthwise of the cylinder 3 and bearing in the ends. The sight opening 7 at the front of the cylinder 3 enables the price-computing chart on the drum 4 to be read when the scale is in use. Rotation of the drum 4 brings the various price-computations into alinement and view through the sight opening 7 as is usual. At the front of the standard 2 and over a portion of the base 1 is the weight receiving platform 8, usually of glass, supported on a frame 9 and within a flange 10, resting upon bases 11, 11, around the frame 9. Said frame may have one or more, preferably two, depending central lugs 12, carrying in lower portions suitable bearings to rest upon bearing knives, 13, extending from the main weighing lever 14, which lever has its fulcrum knife 15 engaging a bearing in the post 16 supported on the base 1. On the other side of the fulcrum 15, the main lever 14 is provided with a bearing knife 17 engaging the bearing 18 in a link 19, which in turn has its lower bearing 20 in engagement with the knife 21 on the parallel lever or evening bar 22. This second lever has its fulcrum at the knife 23 in contact with the bearing plug 24 carried by a swinging socket 25, which support is freely secured through the bolt 26 to the base 1. This gives a free or floating fulcrum to the bar 22 and is a similar construction, thus far described, to the parallel levers,—designated as main lever and evening bar,—in my said prior application. In the present invention I prefer to utilize the second lever or evening bar 22 as the means for connecting the weighing springs and for the operation thereof between the weight receiving platform 8 and said springs, while I prefer to extend the main lever 14 and connect it with the price computing mechanism. To this end I extend a portion or arm of the main lever 14, as shown at 27, beyond the bearing knives 13 and at its forward end provide a knife 28 in position to engage a block 29 in a forked member 30, which member is threaded and receives the rod 31 extending upwardly within the hollow standard 2 and carrying a cross piece 32 supporting a horizontal bar 33 to which a rack bar 34 is adjustably secured at either end of the cylinder 3. This rack bar at its upper portion is provided with teeth 35 adapted to mesh with the corresponding teeth in a gear 36 keyed to the axle 6. Vertical movement of the platform 8 thus oscillates the main lever 14 and its extension 27 depressing the rod 31 and rotating the drum 4 carrying the price-computing chart through engagement of the rack 35 and the gear 36. I also prefer to support the weighing springs 40 from adjacent each end of the cylinder 3 by bolts 41 and nuts 42 thereon, as shown in the drawings and as clearly explained in my said prior application, said springs having connecting links 42 extending downwardly to engage a cross rod 43 running horizontally and lengthwise of the cylinder, to the center of which cross rod is secured the vertically extending link 44 with its lower end threaded into the top of a forked member 45 arranged to straddle the extension 27 of the main lever and to carry a bearing block 46 in its lower portion in which rest the knives 47 connected with the lever 22. I prefer to employ a simple thermostat in connection with the lower lever 22, for this purpose applying a rod 48 of different material from that of the lever 22 to automatically compensate for variations in temperature changes, attaching the knives 47 directly on one end of the thermostat rod 48 and having the other end 49 threaded into a tapped boss 50 adjacent the opposite end of the lever 22, said thermostat fitting and sliding through a bored recess 51 in a boss 52 at the end of the lever 22 near said member 45, substantially as shown.

In order to hold the platform 8 level while permitting it to move vertically, I prefer to employ a construction similar to that shown in my said prior application. This consists in extending an arm 52 from the frame 9 into the standard 2, which arm has its upper portion 53 extending vertically therein and fitted at 54 to a link 55 secured by a pivotal connection at 56 to a rod 57 adjustably held in a lug 58 by a pair of nuts 59 and 60 threaded on the end portion of the rod 57 above and below said lug 58. A dash pot 61 is also provided, having its plunger 62 rigidly attached to an arm 63, extending from the upper portion 53 of the platform holding arm, as shown at 64.

In the operation of the scale, an article to be weighed being applied to the platform 8, the main lever 14 is rocked on its fulcrum knives 15, depressing the outwardly extending portion 27 and correspondingly rotating the drum 4 carrying the price computations. The link 19 rocks the lower lever or evening bar 22 simultaneously with the depression of the platform 8, putting the springs 40 under tension until equilibrium is obtained. By having the thermostat 48 carry the knives 47 connecting this lever 22 with the weighing springs, changes in temperature are automatically compensated for as said thermostat slides through the boss 52 in the lower lever 22. The operation of the dash pot holding the platform 8 level while permitting the vertical reciprocations necessary during the weighing and price computing operations, will be readily understood on reference to the drawings, being substantially identical to that described in my said prior application. It will be noted that one lever is connected to the price computing mechanism, as herein shown, the main lever 14, while the lower lever 22 is connected only to the weighing mechanism, consisting in the springs 40 and their connections. It will be appreciated that this arrangement may be reversed if desired, the important feature being that in my development of a scale of this type, utilizing parallel levers, each preferably operating on the No. 1 principle, one of the levers is used to actuate the price computing device and the other the weighing mechanism. As shown in the drawings, I also prefer to arrange the effective movements of the two levers in a predetermined ratio, giving the price computing devices a longer swing than the oscillations of the weighing lever. In scales of this class it is important to have the price chart move quickly to position and to have as many and compactly arranged computations thereon as is possible, while it is also important to have the vertical movements of the platform 8 as short as it can be made. Also it is desirable to have relatively strong springs 40 to effect the weighing of articles and I accomplish all these desirable advantages by my construction herein illustrated. A relatively strong spring can be secured to one lever so that a very short oscillation of the platform 8 will put the weighed article and the springs into equilibrium, while the same vertical movement of the platform will be sufficient to rotate the price chart drum a considerable distance, giving more room for price computations and facilitating the reading of the same by the observer. These features also are of importance and I wish to claim the same broadly. It will be appreciated that my novel form of parallel levers, each preferably acting on the No. 1 principle, may be reversed in position, direction of operation, or otherwise modified, but the principle of operation being the same, and the advantages of such parallel levers in the automatic compensation of weights, tensions, and the like, will be the same. If the main lever 14 is connected to the weighing springs, and the evening bar 22 utilized to operate the price computing drum, said lever 22 would be employed only and solely as a means of operating the price drum. Also the position of the springs could be reversed if desired, but in either case both levers operate on the No. 1 principle and substantially in parallelism during their oscillations, securing all the advantages of this construction as described and claimed in my said copending applications. It will also be appreciated that the link connection between the two levers may be at any point on said levers, thus securing varying ratios between the two levers where such a construction is desired.

My invention is further described and defined in the form of claims as follows:

1. In a scale of the class described, a platform to receive articles to be weighed, weighing springs, price indicating mechanism, a lever operated by said platform and connected with the weighing springs, and a separate lever parallel with said first lever and similarly operated by the platform and connected with the price indicating mechanism.

2. A scale of the kind described, a platform to receive articles to be weighed, a main weighing lever operated by said platform and a secondary lever parallel therewith and connected thereto, a price chart, weighing springs and connections therewith independently of a counterweight, one of said levers being arranged to operate the price chart and the other lever connected with the weighing springs, and means connecting said levers to be operated simultaneously and in substantial parallelism.

3. A scale of the kind described, a platform to receive articles to be weighed, a main weighing lever operated by said platform and a secondary lever parallel therewith and connected thereto, a price chart, and weighing springs, one of said levers being arranged to operate the price chart and the other lever connected with the weighing springs, and a movable fulcrum for one of said levers.

4. In a scale of the class described, the combination of a main weighing lever, a parallel evening lever, and fulcrums therefor, means connecting adjacent ends of said levers and weighing springs connected with the other end of said evening lever, and price computing mechanism connected with the other end of said main lever.

5. In a platform scale of the class described, the combination with a weight receiving platform of a price chart, weighing springs, a pair of parallel levers arranged to actuate said price chart and put said weighing springs under tension of the weight receiving platform independently of each other, but movable in unison by the operation of the platform, and a link connecting said levers.

6. In a scale of the class described, the combination of a price chart, weighing springs, a pair of parallel levers, and means connecting said levers, one operating the price chart mechanism and the other lever of said pair connecting with the weighing springs, each lever operating on an independent fulcrum, but being maintained substantially in parallelism during their movement.

7. In a scale of the class described, the combination of a price chart, weighing springs, a pair of parallel levers, and means connecting said levers, one operating the price chart and the other lever of said pair connecting with the weighing springs, said levers being arranged one above the other and fulcrumed at different points and in different horizontal planes.

8. In a scale of the class described, a platform to receive articles to be weighed, a main weighing lever operated by said platform and having an extension, a second weighing lever, connecting said lever, whereby both oscillate in substantial parallelism, a price chart, connections from the extension of said main weighing lever to said price chart, weighing springs and connections from said second lever to said weighing springs, in combination with a thermostat carried by one of said levers and operatively connected therewith to compensate for temperature changes in the weighing springs.

In testimony whereof, I have signed my name to this specification, in the presence of two subscribing witnesses.

LEONARD T. JOHNSON.

Witnesses:
JAMES R. HODDER,
HAROLD J. CLARK.